United States Patent [19]

Yamada

[11] Patent Number: 5,032,778
[45] Date of Patent: Jul. 16, 1991

[54] APPARATUS FOR CONTROLLING OPERATING STROKE OF RECIPROCATING MEMBER, USING ENCODER SIGNAL

[75] Inventor: Minoru Yamada, Aichi, Japan

[73] Assignee: Brother Kogyo Kabushiki Kaisha, Aichi, Japan

[21] Appl. No.: 489,525

[22] Filed: Mar. 7, 1990

[30] Foreign Application Priority Data

Mar. 10, 1989 [JP] Japan ................................. 1-58561

[51] Int. Cl.⁵ ............................................ B23B 35/00
[52] U.S. Cl. ......................................... 318/686; 408/9; 408/6; 318/282; 318/560
[58] Field of Search ............... 318/686, 280, 282, 560, 318/563; 408/6, 9

[56] References Cited

U.S. PATENT DOCUMENTS

| | | | |
|---|---|---|---|
| 4,229,683 | 10/1980 | Watanabe et al. | 318/282 |
| 4,318,646 | 3/1982 | Watanabe | 408/6 |
| 4,342,528 | 8/1982 | Nozu et al. | 408/6 |
| 4,692,072 | 9/1987 | Pfister et al. | 408/6 |

Primary Examiner—William M. Shoop, Jr.
Assistant Examiner—John W. Cabeca
Attorney, Agent, or Firm—Oliff & Berridge

[57] ABSTRACT

An apparatus for controlling an operating stroke of a reciprocating member to be reciprocated by a drive motor. The apparatus includes an encoder adapted to generate pulses each of which corresponds to a predetermined incremental distance of movement of the reciprocating member, a counter for counting the pulses during movement of the reciprocating member in a forward direction, a device for converting the operating stroke into the number of the pulses corresponding to a multiple of the incremental distance of movement, and a residual distance which is a difference between the operating stroke and the multiple, a device for converting the residual distance into a corresponding residual time, and a device for commanding the drive motor to stop an operation thereof causing a further forward movement of the reciprocating member, when the residual time has elapsed after a count of the counter is equal to the above-indicated number of the pulses.

12 Claims, 15 Drawing Sheets

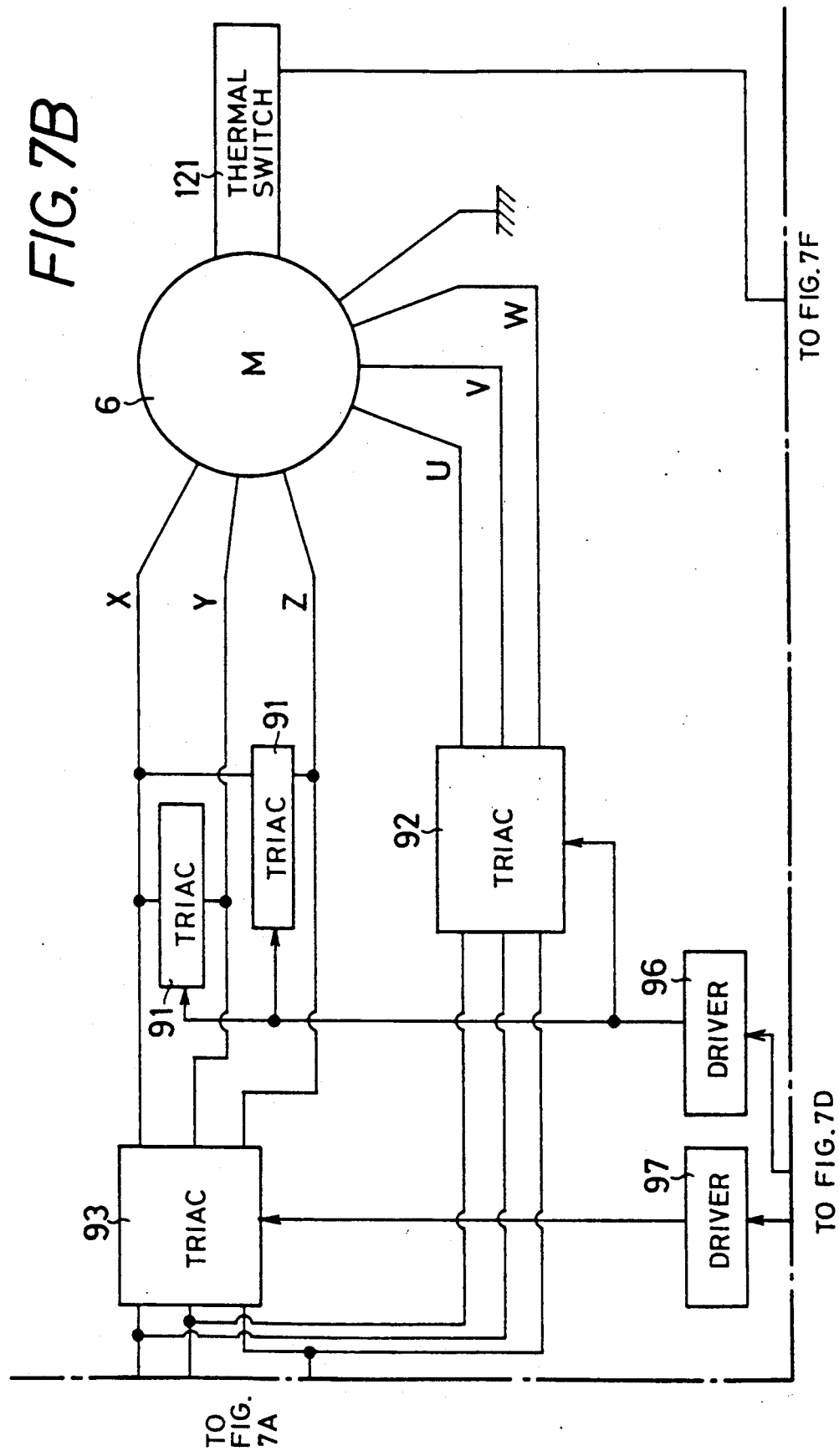

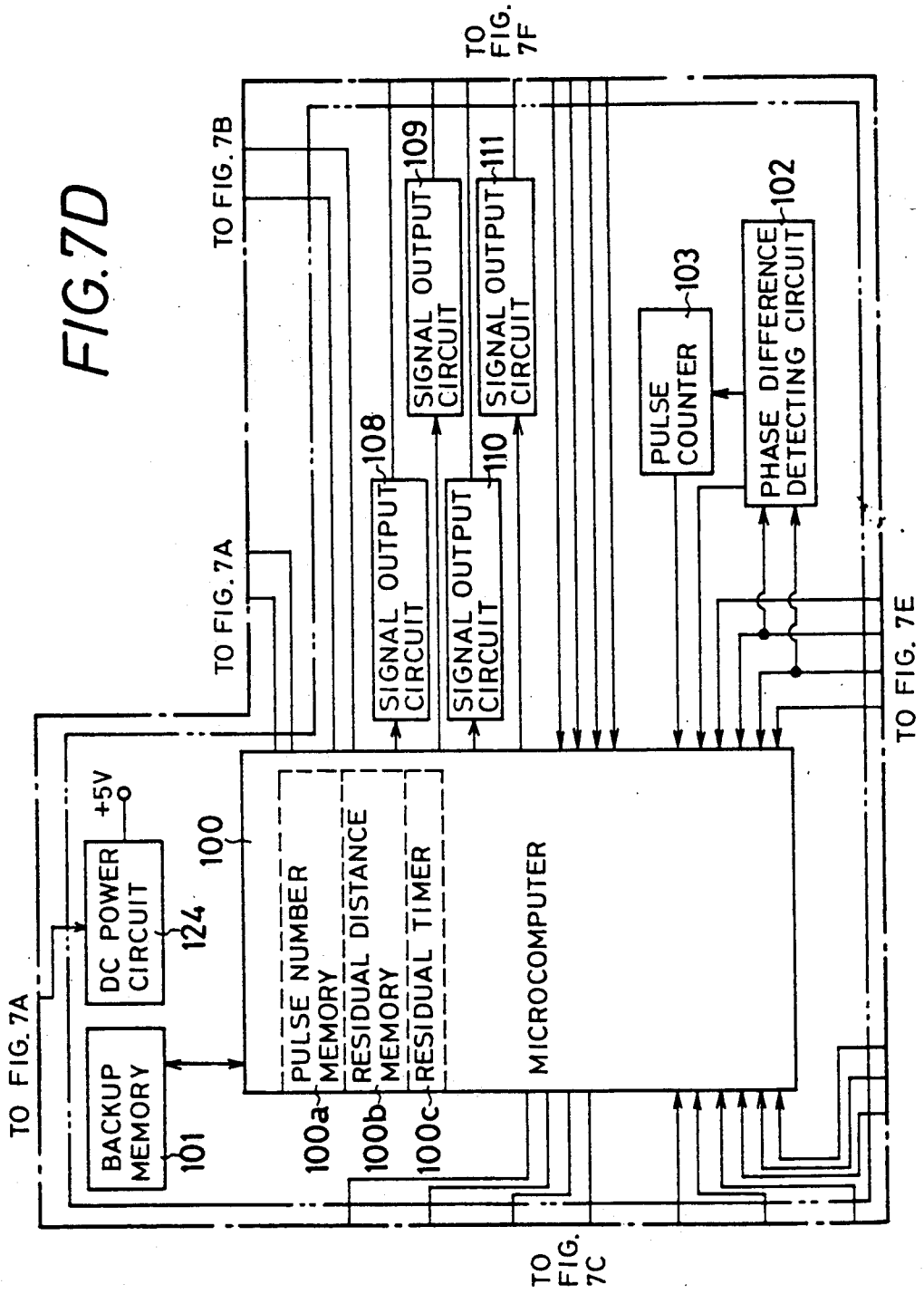

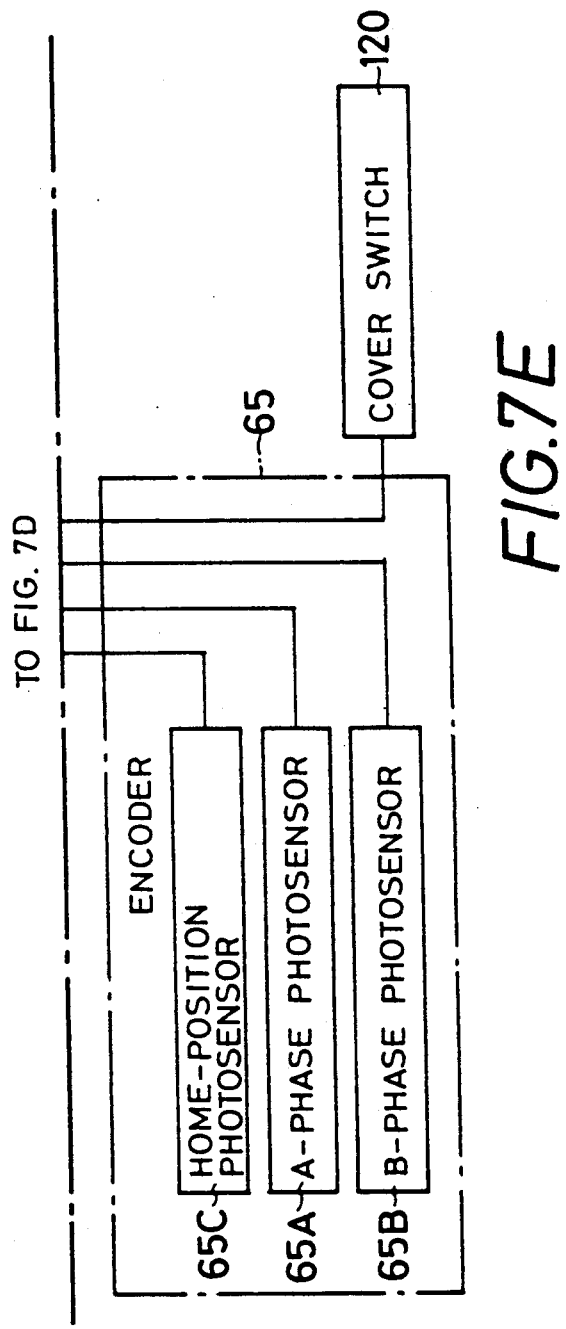

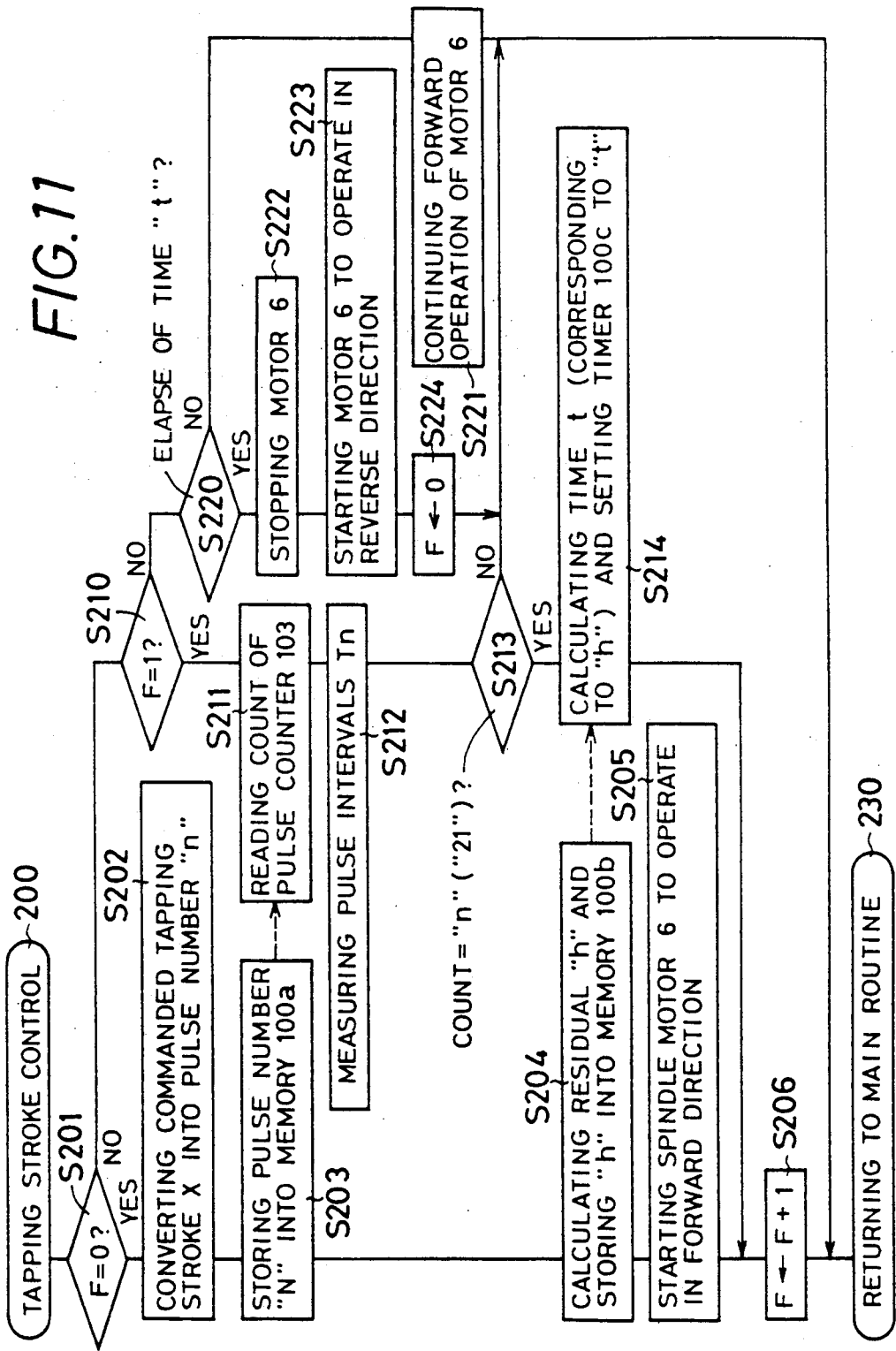

APPARATUS FOR CONTROLLING OPERATING STROKE OF RECIPROCATING MEMBER, USING ENCODER SIGNAL

BACKGROUND OF THE INVENTION

1. Field of the Invention

The present invention relates to a control apparatus for controlling an operating stroke of a reciprocating member such as a spindle quill of tapping machine.

2. Discussion of the Prior Art

An apparatus for controlling a movement of a reciprocating member widely uses a relatively inexpensive encoder for detecting the position of the reciprocating member. For instance, a rotary encoder is used for controlling the operating stroke of a spindle quill of a tapping machine wherein the spindle quill is advanced and retracted while a main spindle is rotating in the forward and reverse directions, respectively, the perform a tapping operation. The advancing and retracting movements of the spindle quill are mechanically synchronized with the forward and reverse rotations of the main spindle (i.e., spindle quill). The rotary encoder generates pulse signals after the forward rotation of the main spindle is started. The control apparatus counts the number of the pulse signals. When the counted number of the pulse signals reaches a predetermined value, the rotating direction of the spindle is switched to the reverse direction, to retract the spindle quill to the original or home position. Namely, the conventional control apparatus is adapted to control the operating stroke or bottoming position of the spindle quill (i.e., a tap held by the quill), by directly counting the pulses generated by the rotary encoder.

In the above arrangement using the encoder, the minimum amount of movement of the spindle quill that can be controlled based on the pulses from the encoder is determined by or limited to the resolution of the encoder. Thus, the accuracy of controlling the operating stroke of the quill is not sufficiently high where the resolving power of the encoder is relatively low.

Consequently, the tapping tool held by the spindle quill may collide with the bottom of a blind hole to be tapped. In other words, the above arrangement does not permit the tap to cut an internal thread down to a point immediately above the bottom of the blind hole, without the tip of the tap bottoming the hole.

The control accuracy of the operating stroke may be improved by using an encoder whose resolution is sufficiently high. In this case, however, the encoder is expensive, and requires higher degree of assembling accuracy and a complicated control circuit for processing the pulse signals from the encoder, thereby increasing the cost of manufacture of the control apparatus.

Usually, an encoder is adapted to generate an A-phase signal, and a B-phase signal whose phase is shifted from the A-phase signal by an amount corresponding to $\frac{1}{4}$ of the pulse interval, so that the direction of movement of the relevant reciprocating member is detected. It is considered to divide a time length corresponding to the pulse interval, into four one-quarter fractions, by using the B-phase signal. To accurately detect the times corresponding to these fractions of the pulse interval, not only the A-phase signal should rise so as to exactly establish the nominal pulse interval, but also the A-phase signal should fall and the B-phase signal should rise and fall to exactly establish the pulse duration. Although the pulse interval of the A-phase signal is held comparatively constant, the pulse durations of the A-phase and B-phase signals tend to fluctuate, particularly where an inexpensive encoder is used.

SUMMARY OF THE INVENTION

It is therefore an object of the present invention to provide a control apparatus for controlling an operating stroke of a reciprocating member, which uses a relatively inexpensive encoder having comparatively low resolution but provides a minimum controllable amount smaller than that corresponding to the resolution of the encoder.

The above object may be attained according to the principle of the present invention, which provides an apparatus for controlling an operating stroke of a reciprocating member which is adapted to be reciprocated over a predetermined distance by a bidirectional drive motor, through a power transmission mechanism operatively connecting the reciprocating member and the drive motor, comprising: (a) stroke setting means for specifying the operating stroke of the reciprocating member; (b) an encoder for generating pulses each of which corresponds to a predetermined incremental distance of movement of the reciprocating member; (c) counting means for counting the pulses generated by the encoder while the reciprocating member is moved in a forward direction; (d) first calculating means for converting the specified operating stroke into the number of the pulses corresponding to a multiple of the incremental distance of movement of the reciprocating member, and a residual distance which is a difference between the specified operating stroke and the multiple; (e) second calculating means for converting the residual distance into a corresponding residual time necessary for the reciprocating member to move by the residual distance; and (f) commanding means for commanding the drive motor to stop an operation thereof causing a further movement of the reciprocating member in the forward direction, when the residual time has elapsed after a count of the counting means is equal to the number of the pulses calculated by the first calculating means.

In the control apparatus of the present invention constructed as described above, the residual distance which is the difference between the specified operating stroke and the multiple of the incremental distance of movement of the reciprocating member is converted into the corresponding residual time, which is a fraction of the pulse interval after the counting means has counted the number of the pulses which corresponds to the above-indicated multiple. Accordingly, the position of the reciprocating member at which the drive motor is stopped or switched to operate in the reverse direction can be detected, by measuring the residual time corresponding to a fraction of the pulse interval. Thus, the present control apparatus permits the minimum controllable amount of the operating stroke of the reciprocating member to be smaller than the incremental distance of movement of the reciprocating member which corresponds to the resolution of the encoder. Thus, the control apparatus makes it possible to use a relatively inexpensive encoder having relatively low resolution, while assuring high accuracy of control of the operating stroke of the reciprocating member.

BRIEF DESCRIPTION OF THE DRAWINGS

The above and other objects, features and advantages of the present invention will become more apparent by reading the following description of a presently preferred embodiment of the invention, when considered in connection with the accompanying drawings, in which:

FIG. 11 is a flow chart illustrating an operation of the control apparatus of FIG. 7.

DETAILED DESCRIPTION OF THE PREFERRED EMBODIMENT

Figure 1:
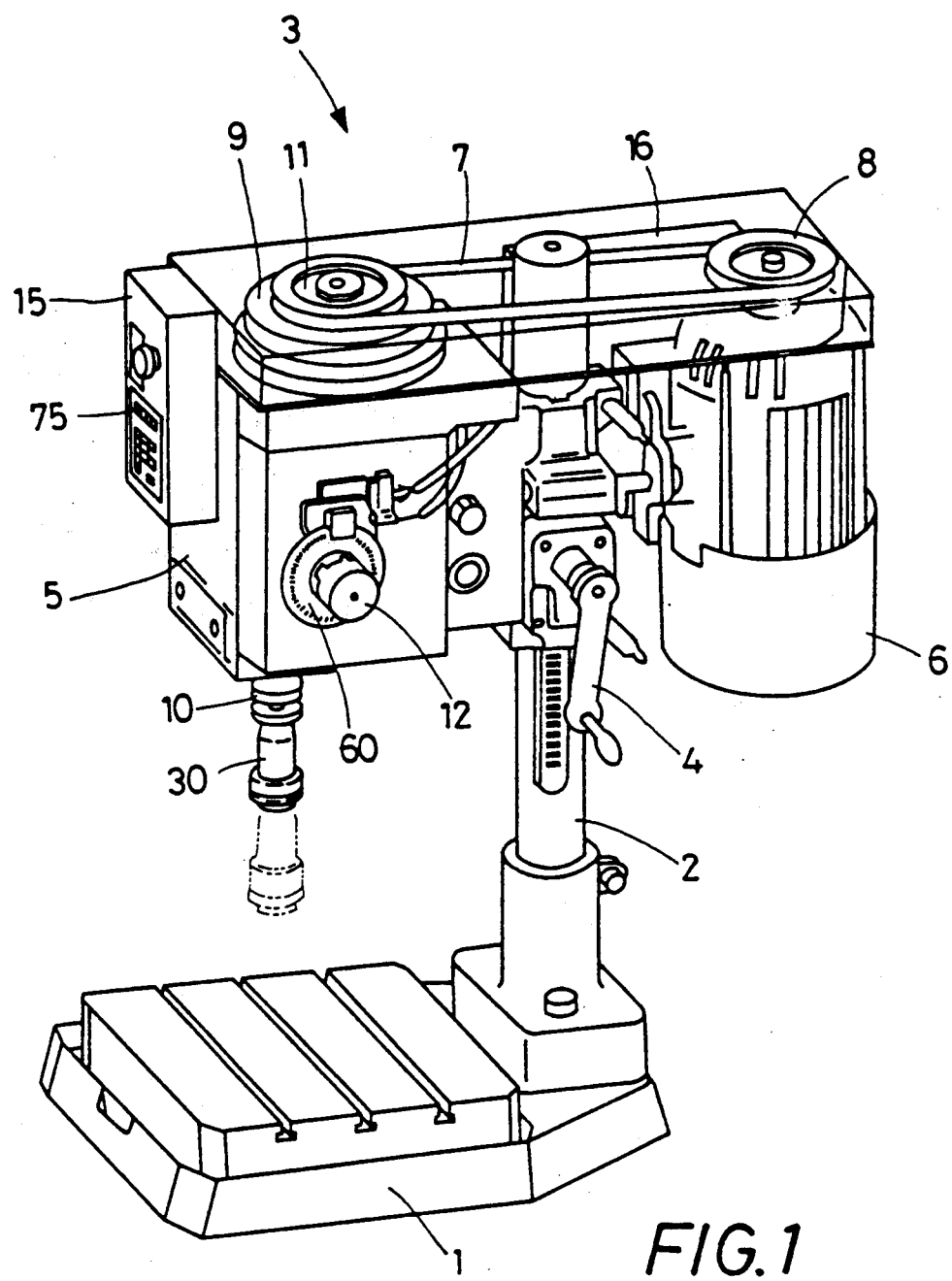
FIG. 1 is a perspective view showing a tapping machine to which the principle of the present invention is applied.

Referring first to FIGS. 1–4, the tapping machine has a column 2 which extends upright from a base 1 and supports a tapping unit generally indicated at 3 in FIG. 1. The tapping unit 3 is vertically positioned on the column 2, by operating a vertical positioning lever 4, and includes a spindle head 5 and a spindle motor 6 for driving the spindle head 5 through a V-belt 7. The spindle motor 6 is a bidirectional variable-speed 4/8-pole pole-change induction motor. The spindle head 5 has a main spindle 10, which is operatively connected to the spindle motor 6 via the V-belt 7, a drive pulley 8, a driven pulley 9 and other power transmission components which will be described. The speed of the main spindle 6 with respect to that of the spindle motor 6 is variable in three steps by changing the V-grooves of the pulleys 8, 9 which engage the V-belt 7. The main spindle 10 has a tap chuck 30 fixed to its lower end.

The spindle head 5 incorporates a power transmitting mechanism coupled to the driven pulley 9, which is constructed so that the main spindle 10 is fed in the forward or tapping direction while the spindle motor 6 is rotating in the forward direction, and is fed in the reverse or retracting direction while the motor 6 is rotating in the reverse direction. The feed rate of the spindle 10 or the tapping pitch is determined or changed by first and second change gears 41, 42.

The driven pulley 9 incorporates an overload protective spindle clutch 11 which slips upon application of an excessive torque to the spindle 10 during a tapping operation, to protect the tapping machine from damage due to the overload. The power transmitting mechanism of the spindle head 5 incorporates an overload protective feed clutch 12 which slips to protect the machine when an excessive thrust is applied to the spindle 10 in the axial or feeding direction. Adjacent to the feed clutch 12, there is provided a rotary encoder 60 for detecting the operating position or stroke of the main spindle 10.

The spindle head 5 has an operator's control panel 15 provided on its front side, for the operator to enter necessary tapping data, select the operating mode of the machine, and perform other operations for controlling the machine. The tapping unit 3 has a control console or board 15 provided on its left side, for controlling the spindle motor 6, according to the signals from the operator's control panel 15, rotary encoder 60 and other components. Namely, the control board 15 includes a microcomputer 100 (FIG. 7) for performing various control operations, such as turning on and off the motor 6 and changing the operating direction and the number of poles of the motor 6.

Figure 2:
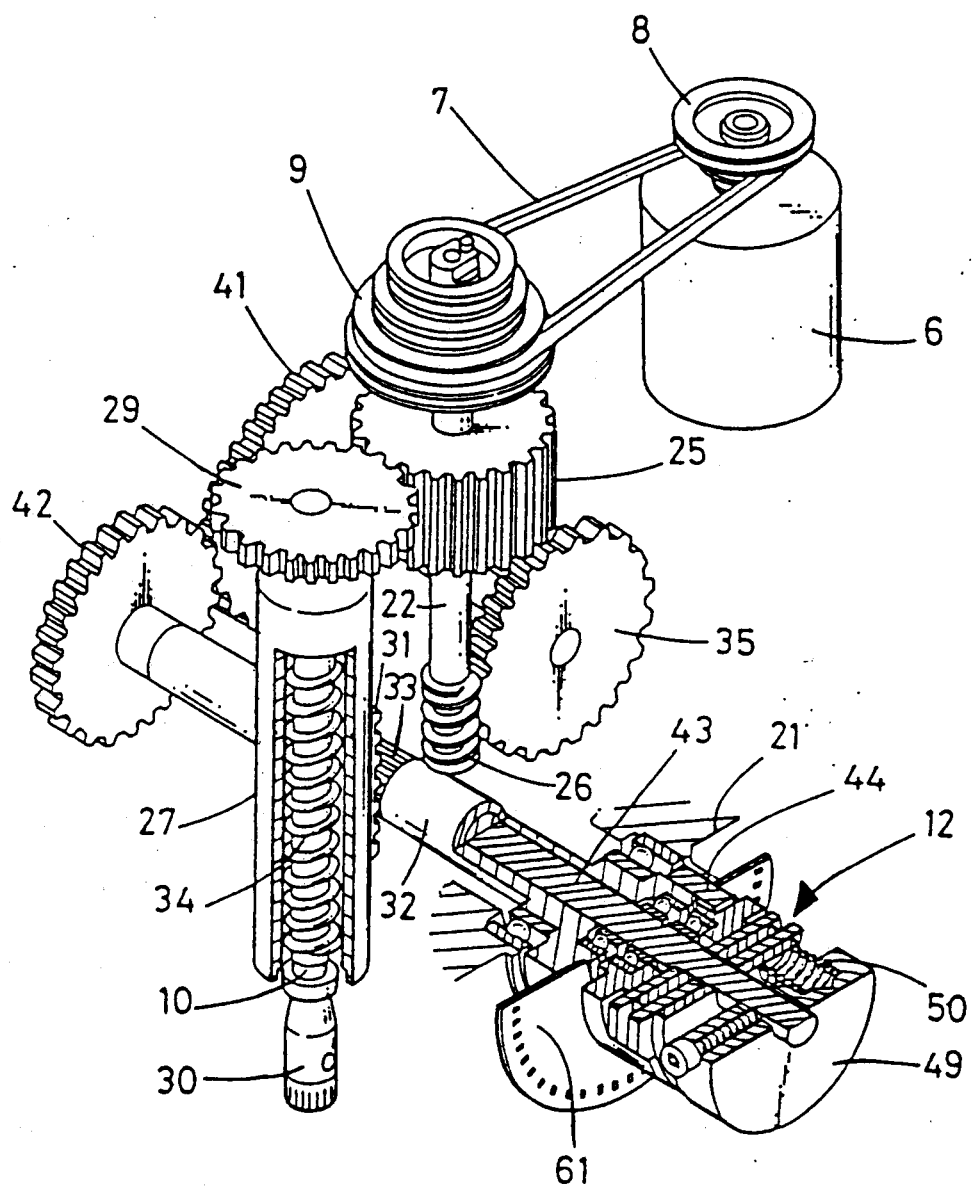
FIG. 2 is a perspective view of a power transmitting mechanism of the tapping machine of FIG. 1.
Figure 3:
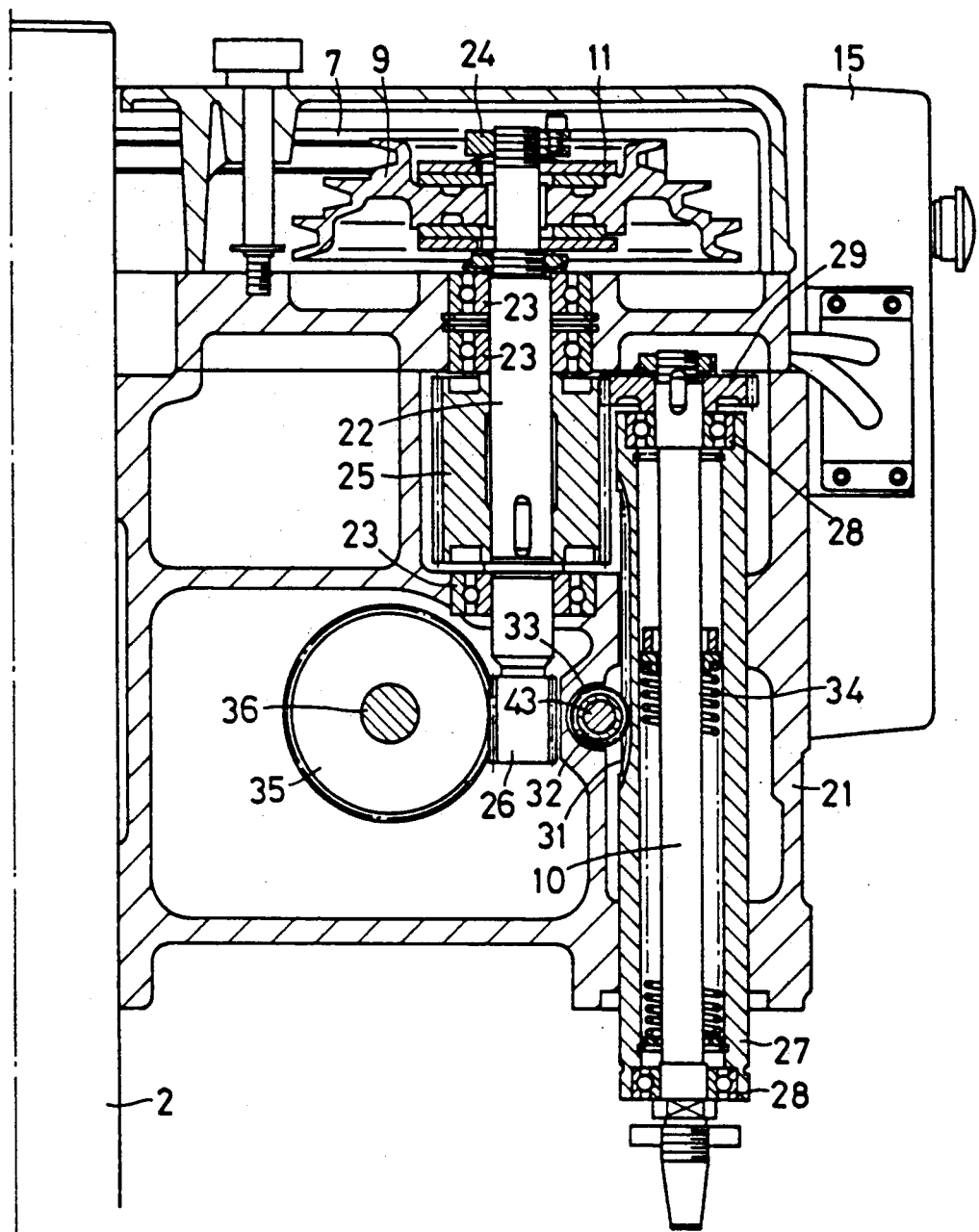
FIG. 3 is an elevational view in vertical cross section of a spindle head of the tapping machine.
Figure 4:
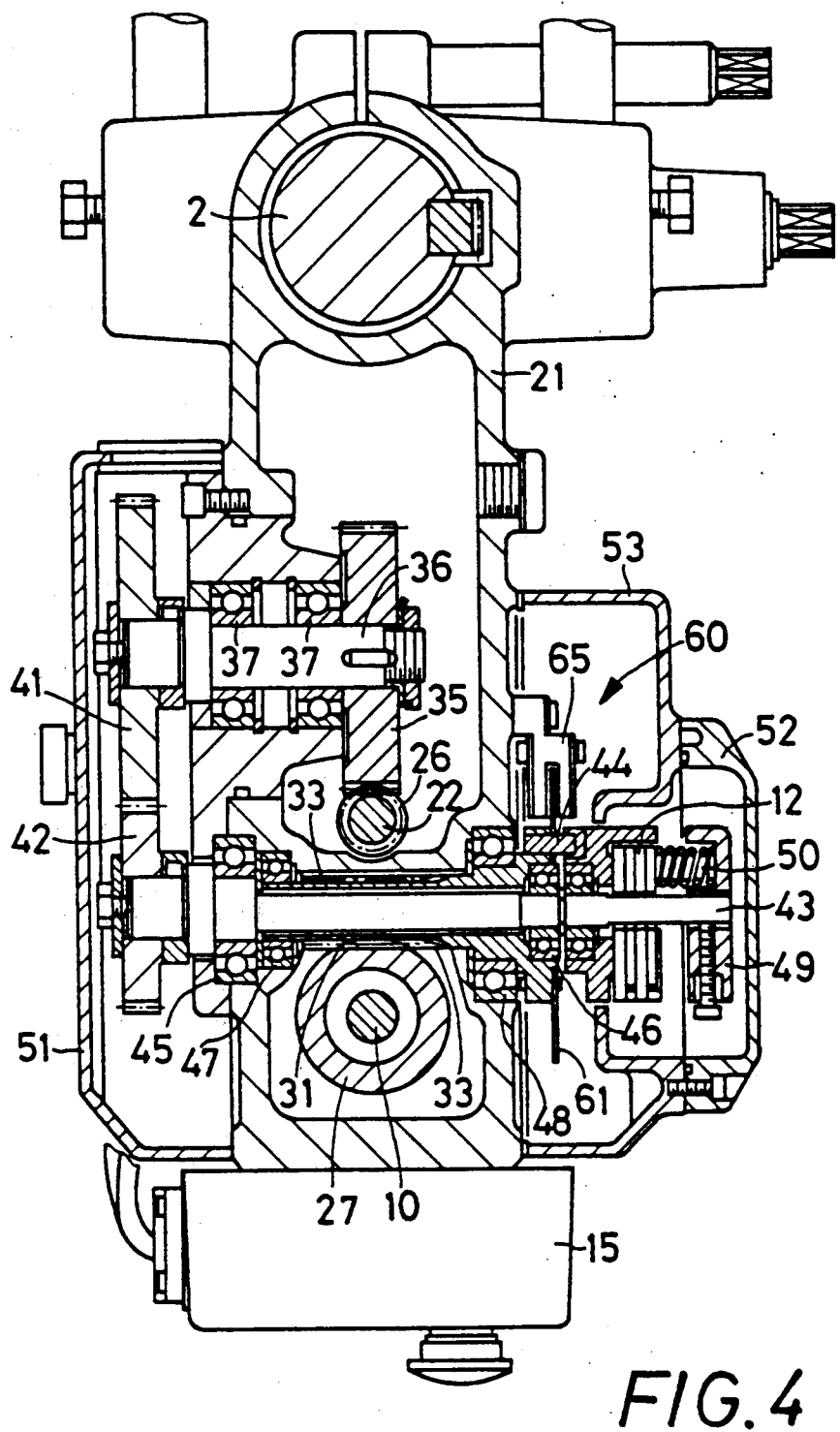
FIG. 4 is a horizontal cross sectional view of the spindle head.

The power transmission mechanism incorporated in the spindle head 5 is illustrated in perspective in FIG. 2, and in vertical and horizontal cross sections in FIGS. 3 and 4, respectively.

The spindle head has a frame 21 by which a drive shaft 22 is rotatably supported in the vertical direction through bearings 23. The driven pulley 9 is attached to the upper end of the drive shaft 22 through the spindle clutch 11. The operating torque of the spindle clutch 11 is adjustable by spindle torque adjusting nut 24. The drive shaft 22 has a main drive gear 25 fixedly mounted thereon at an axially intermediate portion thereof. The drive shaft 22 has a worm 26 formed at the lower end.

The frame 21 also supports a spindle quill 27 such that the quill 27 is vertically movable. The main spindle 10 is rotatably supported within the spindle quill 27 through bearings 28. The spindle quill 27 is not rotatable, and the spindle 10 is rotatable relative to the quill 17 and is vertically reciprocable with the quill 27. The spindle 10 has a spindle drive gear 29 fixed to its upper end, and the gear 29 meshes with the main drive gear 25 so that the spindle 10 is rotated through the gears 25, 29. As indicated above, the spindle 10 is adapted to hold the tap chuck 30 at its lower end, for chucking a tap.

The spindle quill 27 has a rack 31 formed on the outer circumference, so as to extend in the longitudinal direction. The rack 31 engages a pinion 33 formed on a pinion sleeve 32 which is supported by the frame 21 so as to extend in the horizontal direction. The spindle quill 27 is biased by a spring 34 for eliminating a backlash between the rack 31 and the pinion 33.

The worm 26 at the lower end of the drive shaft 22 engages a worm wheel 35 supported by a first rotary shaft 36. This shaft 36 is rotatably supported by the frame 21 through bearings 37, so as to extend in the horizontal direction. The first change gear 41 indicated above is removably fixed to one of the opposite ends of the shaft 36 which projects from the left-hand side wall of the frame 21. The first change gear 41 meshes the second change gear 42 also indicated above, which is removably fixed to the corresponding end of a second rotary shaft 43. This shaft 43 extends through the pinion sleeve 32, such that the end to which the feed clutch 12 is attached projects from the right-hand side wall of the frame 21. A rotary motion of the second rotary shaft 43 is transmitted to the pinion sleeve 32 through the feed clutch 12. The feed clutch 12 is connected to the pinion sleeve 32 by means of a pinion pin 44. The second rotary shaft 43 is supported by the frame 21 through two bearings 45, 46, while the pinion sleeve 32 is supported by the frame 21 through bearings 47, 48. The pinion 33 indicated above is formed on the outer circumferential surface of an axially intermediate portion of the pinion sleeve 32, so that a rotary motion of the pinion sleeve 32 is converted into a linear vertical reciprocating movement of the spindle quill 27, through the mutually engaging pinion 33 and rack 31.

In the power transmission mechanism constructed as described above, the tapping pitch or the feeding distance of the quill 27 per unit angle of rotation of the quill 27 is changed by changing the first and second change gears 41, 42. The operating torque of the feed clutch 12 is adjustable by changing the biasing force of a biasing spring 50, by operating a feed torque adjusting nut 49. The change gears 41, 42 are covered by a cover 51, while the feed clutch 12 is covered by covers 52, 53.

Figure 5:
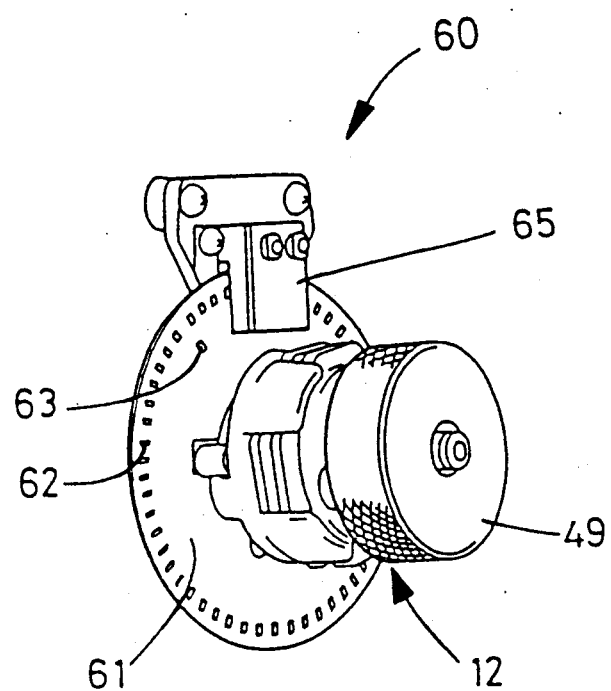
FIG. 5 is a perspective view of a rotary encoder provided on the tapping machine.
Figure 7:
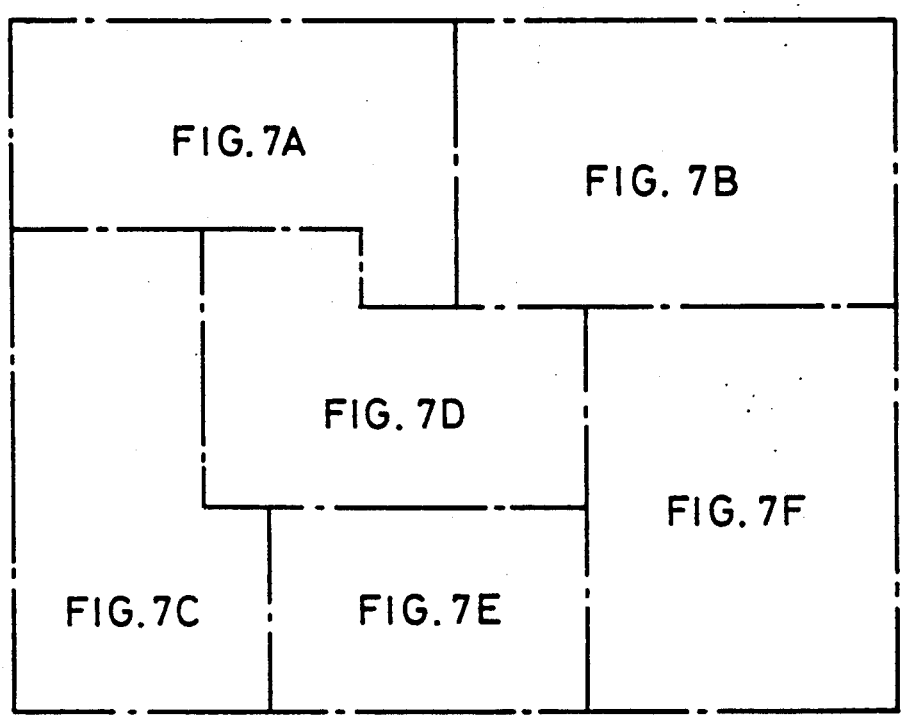
FIG. 7 is a block diagram showing one embodiment of a control apparatus of the present invention adapted to control the tapping machine of FIG. 1.
Figure 7A:
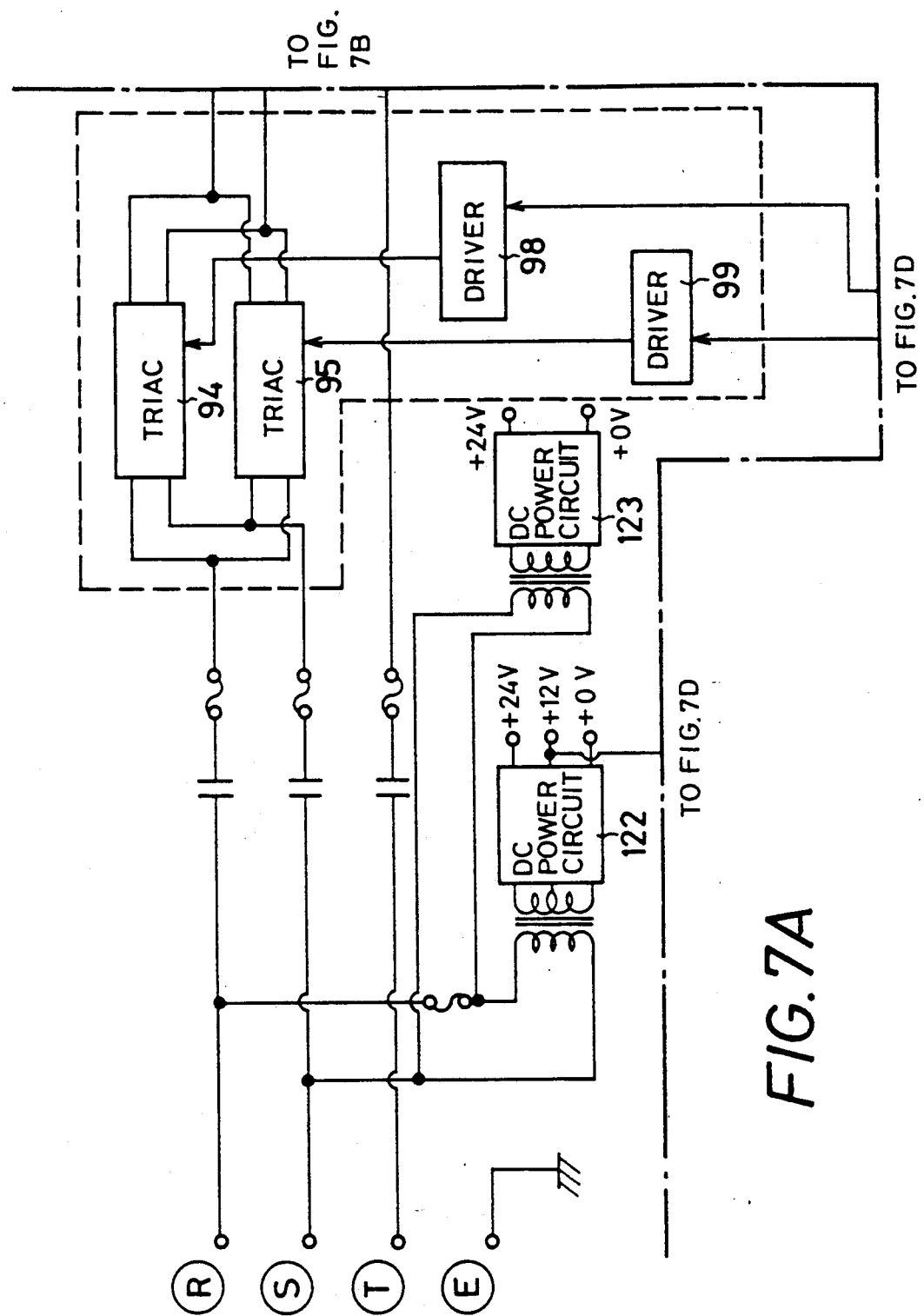
Figure 7C:
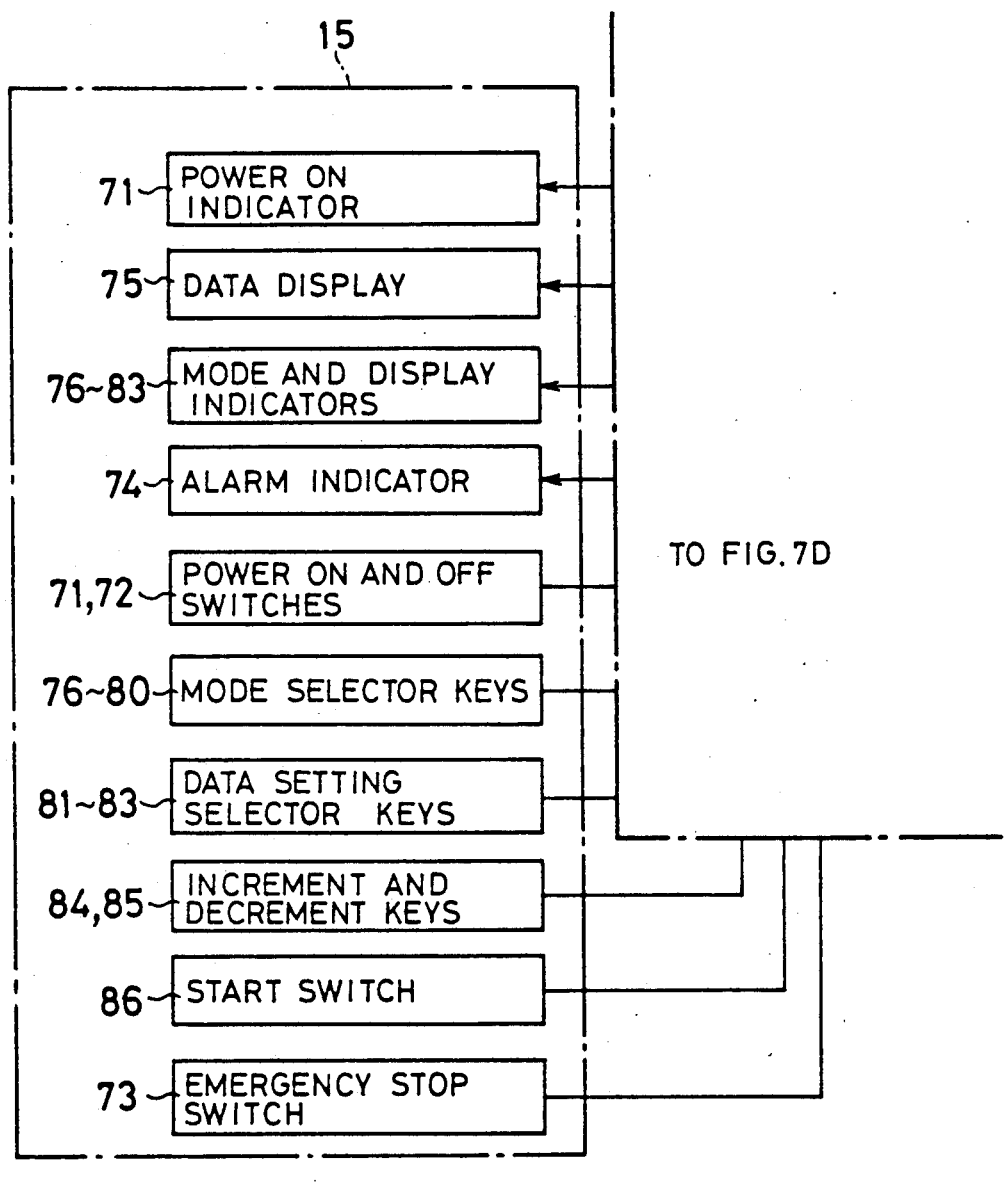
Figure 7F:
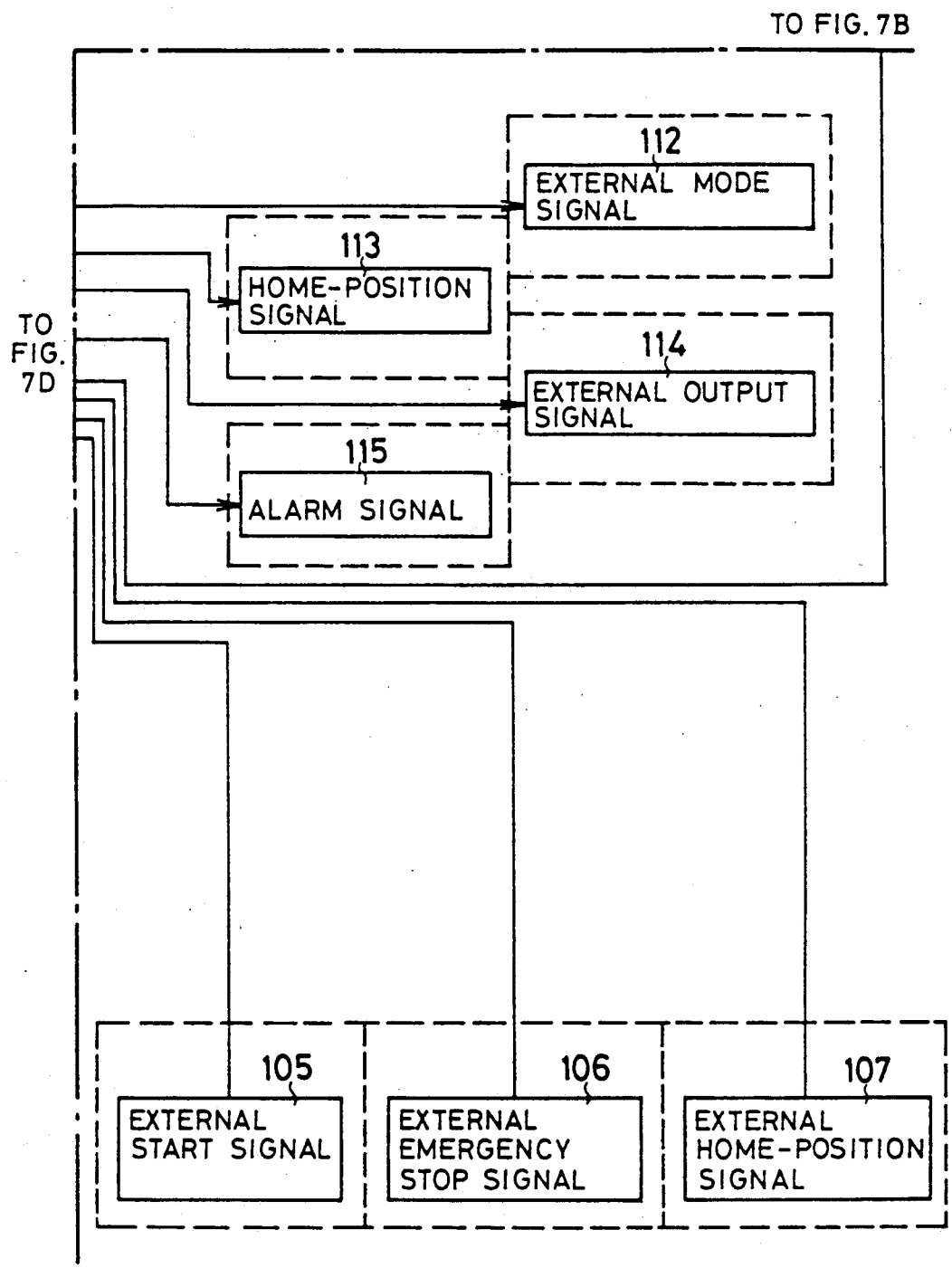
Figure 8:
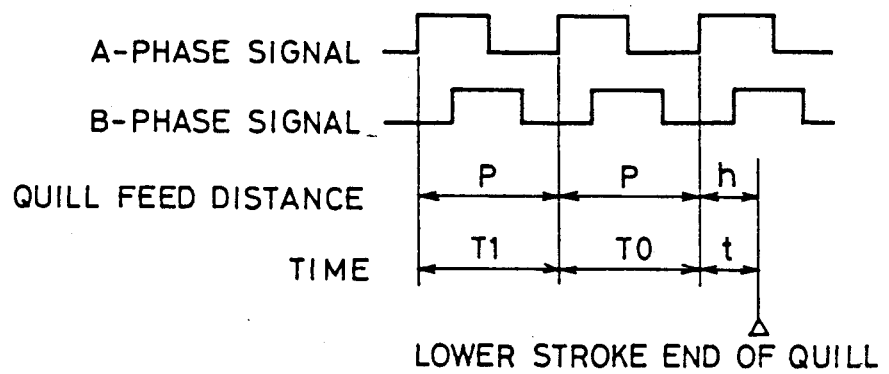
FIG. 8 is a view illustrating signals produced by the rotary encoder of FIG. 5.

The rotary encoder 60 will be described in detail. The encoder 60 includes an encoder disk 61 which is fixed to the end of the pinion sleeve 32 adjacent to the feed clutch 12 on the second rotary shaft 43, as shown in FIG. 2. The encoder disk 61 is rotated with the pinion sleeve 32, which rotates to reciprocate the spindle quill 27. Accordingly, the rotation of the encoder disk 61 represents the position or operating stroke of the quill 27. As shown in FIG. 5, the encoder disk 61 has a multiplicity of apertures 62, which are equally spaced from each other in the circumferential direction of the disk 61. The rotary encoder 60 further includes a photoelectric detector 65 fixed to the frame 21. The detector 65 has three light emitting elements in the form of diodes disposed on one side of the disk 61, and corresponding three photosensors in the form of phototransistors disposed on the other side of the disk 61. The photoelectric detector 65 is adapted to detect the passage of the apertures 62 during rotation of the disk 61. The angular spacing of the apertures 62 is determined so as to correspond to a feeding distance of 0.5 mm of the spindle 10. The encoder disk 61 further has a home-position aperture 63, formed therethrough at a position radially inwardly of the circular array of apertures 62. This home-position aperture 63 is provided to detect the uppermost end or home or original position of the spindle 10. The above-indicated three phototransistors of the photoelectric detector 65 serve as an A-phase sensor 65A, a B-phase sensor 65B and a home-position sensor 65C, as indicated in FIG. 7. The A-phase and B-phase sensors 65A, 65B, which generate A-phase and B-phase signals (as indicated in FIG. 8), respectively, are spaced apart from each other in the circumferential direction of the encoder disk 61, by a circumferential space corresponding to a quarter of the angular spacing of the apertures 62. The A-phase and B-phase signals permit the detection of not only the rotating angle but also the rotating direction of the disk 61, namely, the distance and direction of vertical movement of the spindle quill 27. The home-position sensor 65C is adapted to detect the passage of the home-position aperture 63 for detecting the home position of the spindle quill 27 (spindle 10), as indicated above. Thus, the encoder disk 61 and the photoelectric detector 65 cooperate to constitute the rotary encoder 60.

Figure 6:
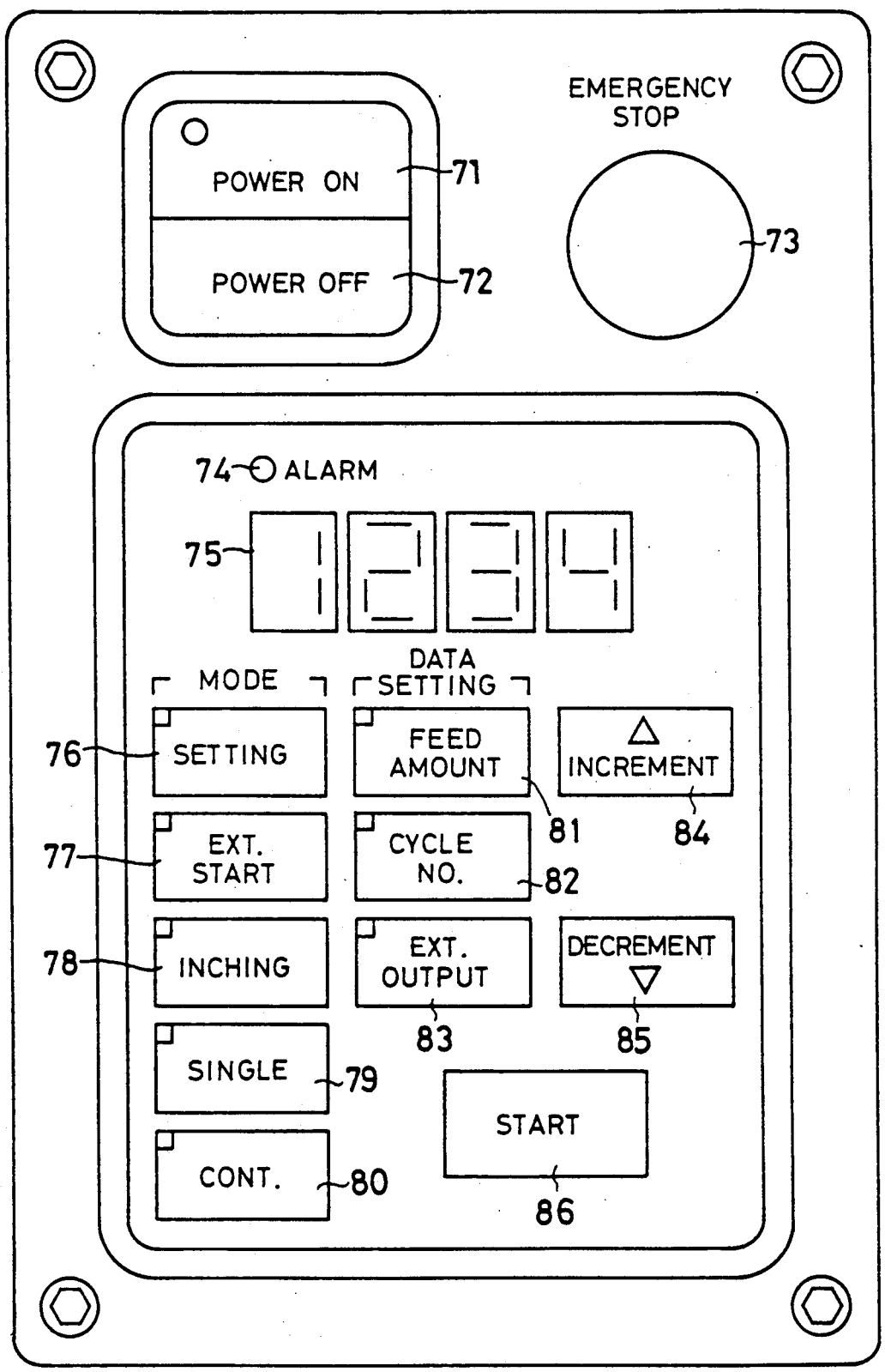
FIG. 6 is a front elevational view of an operator's control panel provided on the machine.

The operator's control panel 15 has various operator's control switches and indicator lights, as shown in the front elevational view of FIG. 6, which includes: a POWER ON and a POWER OFF switch 71, 72 with indicator lights, for turning on and off the tapping machine (control board 16); an EMERGENCY STOP switch 73 for stopping a tapping operation and returning the spindle 10 to the home position while rotating it in the reverse direction; an ALARM indicator light 74 disposed below the POWER OFF switch 72; four-digit seven-segment DATA display 75 for indicating the operating stroke of the spindle 10 and other digital amounts; MODE selector keys 76-80 with indicator lights; DATA SETTING keys 81-85, the keys 81-83 having respective indicator lights; and a START key 86 for starting an operation of the machine in the mode selected by the selector keys 76-80, according to the data entered through the DATA SETTING keys 81-85.

The MODE selector keys 76-80 are used to select one of five modes of operation of the machine. The keys 76-80 consist of: a DATA SETTING key 76 for establishing a DATA SETTING mode in which data may be entered; an EXTERNAL START key 77 for establishing an EXTERNAL START mode in which the machine is started when a start command is received from a foot-operated start switch or an external device; an INCHING key 78 for establishing an INCHING mode in which the spindle quill 27 is moved with the motor 6 operated as long as or each time the START key 86 is operated, this mode being used for set-up operation; a SINGLE CYCLE key 79 for establishing a SINGLE CYCLE mode in which one tapping cycle is performed each time the START key 86 is operated; and a CONTINUOUS CYCLING key 80 for establishing a CONTINUOUS CYCLING mode in which a tapping cycle is repeated by one operation of the START key 86.

The DATA SETTING keys 81-85 consist of: a FEED AMOUNT key 81 for displaying on the display 75 a preset operating stroke X of the spindle quill 27; a CYCLE NUMBER key 82 for setting a desired number of tapping cycles to be performed in the CONTINUOUS CYCLING mode; an EXTERNAL OUTPUT key 83; an INCREMENT key 84 for incrementing the operating stroke X displayed on the display 75; and a DECREMENT key 85 for decrementing the displayed operating stroke X.

Referring next to the block diagram of FIG. 7, the control apparatus used for the present tapping machine includes triode AC semiconductor switches 91-95 in the form of so-called "triacs", for controlling the bidirectional 4/8-pole pole-change induction motor 6, that is, operating the motor 6 in the forward or reverse direction and effecting a pole changing control of the motor 6. The triacs 91, 92 are used for establishing the 4-pole mode while the triac 93 is used for establishing the 8-pole mode. The triacs 94 and 95 are used for establishing the forward and reverse operating directions of the motor 6, respectively.

The triacs 91-95 are connected through respective drivers 96-99 to the microcomputer 100, which has a backup memory 101 for reserving stored data even while power is removed from the machine.

The various components 71-86 provided on the operator's control panel 15 are also connected to the microcomputer 100, so that signals from the switches and keys 71-73 and 76-86 are applied to the microcomputer 100 and so that the indicator lights 71, 72, alarm indicator light 74, indicator lights 76-83, and DATA display 75 are driven. The photoelectric detector 65 of the rotary encoder 60 is also connected to the microcomputer 100, so that the A-phase and B-phase signals and the home-position signal from the sensors 65A-65C are received by the microcomputer 100. The A-phase and B-phase signals are also applied to a phase difference detecting circuit 102, so that the circuit 102 applies to the microcomputer 100 a direction signal indicative of the direction of operation of the motor 6, or the direction of movement of the spindle quill 27 (spindle 10). A pulse counter 103 is provided to count the number of pulses of the A-phase signal, in the incrementing or decrementing direction depending upon the operating direction of the motor 6. The count of the pulse counter 103 is changed upon rising of each A-phase signal pulse, and the signal representative of the count is applied to the microcomputer 100.

The microcomputer 100 receives an EXTERNAL START signal 105 from the foot-operated switch or external device in the EXTERNAL START mode described above, an EXTERNAL EMERGENCY STOP signal 106 from the external device, and an EXTERNAL HOME-POSITION signal 107 from a limit switch provided on the machine. The EXTERNAL HOME-POSITION signal 107 represents a RETRACT position different from the original home position detected by the home-position sensor 65C. The quill 27 is returned to the RETRACT position after the lower end of the operating stroke X is reached in each tapping cycle in the CONTINUOUS CYCLING mode. The microcomputer 100 is connected to signal output circuits 108-111 which generate an EXTERNAL MODE signal 112, a HOME-POSITION signal 113, an EXTERNAL OUTPUT signal 114, and an ALARM signal 115. These signals from the output circuits 108-111 are used to control an indexing table provided on the tapping machine, or other tapping machines.

A cover switch 120 is disposed near the cover 51 covering the change gears 41, 42, so that the switch 120 is closed when the cover 51 is placed in position after the appropriate change gears 41, 42 have been installed. A signal from this cover switch 120 is applied to the microcomputer 100, to inhibit the spindle motor 6 from being energized for safety purpose, when the cover 51 is not installed.

The microcomputer 100 also receives a signal from a thermal switch 121 provided for the spindle motor 6, for detecting the overheating of the motor 6. The control apparatus uses DC power circuits 122-124 for supplying power to the drivers 96-99.

The microcomputer 100 determines the position of the spindle quill 27 (spindle 10), according to the A-phase and B-phase signals from the sensors 65A, 65B of the photoelectric detector 65 of the rotary encoder 60 and the count of the pulse counter 103, and applies the drive signals to the drivers 96-99 according to the data entered through the operator's control panel 15, to control the spindle motor 6 in the selected mode.

In the SINGLE CYCLE mode, for example, the microcomputer 100 commands the spindle motor 6 to be started to operate in the forward direction, to feed the spindle quill 27 by a predetermined distance for performing a tapping operation. When the quill 27 has been advanced by the predetermined tapping distance, the microcomputer 100 commands the motor 6 to be operated in the reversed direction, thereby retracting the spindle quill 27 to the home position.

In the present tapping machine having the control apparatus described above, the operating stroke of the spindle 10 or spindle quill 27 is controlled according to the signals from the photoelectric detector 65, more precisely, based on the number of the pulses of the A-phase signal 65A corresponding to a multiple of an incremental feed distance of the quill 27, and the time lapse after the rise of the last pulse. This aspect of the present embodiment will be described in greater detail.

As indicated in FIG. 8, the pulse interval of the A-phase signal from the sensor 65A corresponds to the incremental feed distance P of the quill 27 (spindle 10), which corresponds to the angular spacing of the apertures 62 formed in the encoder disk 61. In other words, each pulse of the A-phase signal rises at the end of the incremental feed distance of the quill 27. In the present tapping machine, the incremental feed distance P is 0.5 mm. The operating stroke X is defined as a distance between the uppermost position (home position) and the lowermost position (bottoming point of the tap) of the quill 27, and is preset through the operator's control panel 15. The operating stroke X is a sum of a multiple of the incremental feed distance P of the quill 27, and a fraction "h" of the incremental feed distance P. The multiple of the incremental feed distance P is equal to the number of pulses of the A-phase signal, and the fraction "h" may be converted into a residual time "t" which is a fraction of the pulse interval T. Thus, the predetermined operating stroke X can be detected by counting the number of pulses of the A-phase signal and converting the residual distance "h" into the residual time "t" By using only the A-phase signal received from the A-phase sensor 65A of the photoelectric detector 65 of the encoder 60, this control arrangement provides a minimum controllable amount of the operating stroke X of the quill 27, which is smaller than the incremental feed distance P determined by the resolution of the encoder 60.

The conversion of the residual distance "h" into the residual time "t" will be described by reference to the graphs of FIGS. 9 and 10, which indicate the incremental feed distances P corresponding to the last three pulses of the A-phase signal indicated at T0, T1, T2 (each equal to the pulse interval T), which are generated before the lower stroke end of the operating stroke X is reached.

Figure 9:
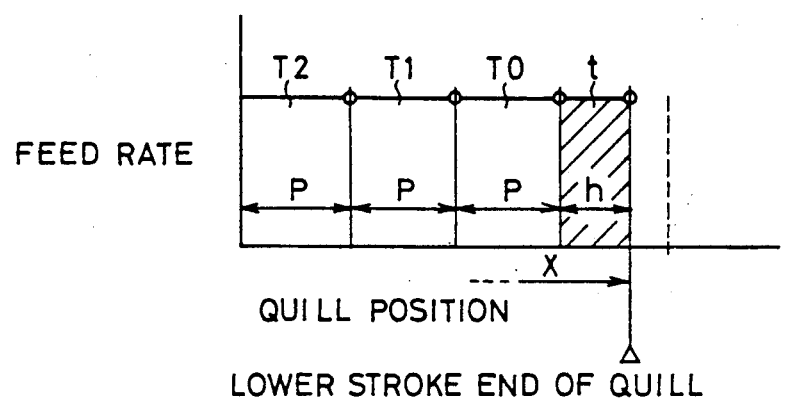
FIGS. 9 and 10 are graphs indicating a relationship between a feed rate and a position of a spindle quill of the machine.

In a normal tapping operation using a tap having a small diameter, the feed rate of the quill 27 is constant, as indicated in FIG. 9. Therefore, the operating stroke X of the quill 27 and the residual time "t" are represented by the following equations (1) and (2), respectively:

$$X = nP + h \qquad (1)$$

$$t = h/P \cdot T0 \qquad (2)$$

where, n = integer number of pulses of the A-phase signal

Figure 10:
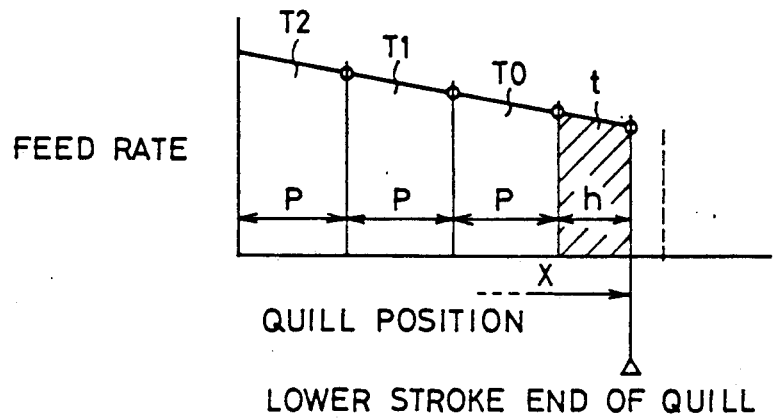

In a tapping operation using a tap having a relatively large diameter or a tapping operation for cutting a tapered thread, the feed rate of the quill 27 is continuously lowered, as indicated in FIG. 10, due to a slipping phenomenon of the induction motor 6 with an increasing tapping load applied thereto. In this case, the time "t" can be calculated by linear approximation based on the pulse intervals T0, T1 and T2, according to the following equations (3)-(6):

$$\Delta T1 = T2 - T1 \qquad (3)$$

$$\Delta T2 = T1 - T0 \qquad (4)$$

A pulse interval T0′ which includes the time "t" may be obtained from the equation (5):

$$T0' = T0 - \frac{\Delta T1 + \Delta T2}{2} \tag{5}$$

Therefore, the residual time "t" necessary for the quill 27 to be fed by the residual distance "h" can be calculated according to the following equation (6):

$$t = h/P \cdot T0 \tag{6}$$

When the feed rate in the case of FIG. 10 is the same as that in the case of FIG. 9, the pulse interval T0′ is equal to the nominal pulse interval T, and the equation (6) is the same as the equation (2).

Referring to the flow chart of FIG. 11, there will be described a tapping stroke control routine indicated at 200 in the figure, which is implemented by the microcomputer 100 of the control apparatus of the tapping machine.

Initially, step S201 is executed to determine whether a flag F is set at "0" or not. Since the flag F was reset to "0" at the end of each tapping cycle, step S201 is followed by steps S202–S205 for performing a series of operations necessary to be completed prior to starting a tapping cycle. Namely, the control flow first executes step S202 to calculate the number "n" of pulses of the A-phase signal which corresponds to the commanded operating stroke X which was specified through the operator's control panel 15. More particularly, if the operating stroke X of the quill 27 is 10.6 mm, for example, the operating stroke X is a sum of 10.5 mm+0.1 mm, which is a sum of (21×0.5 mm)+0.1 mm. Since the incremental feed distance of the quill 27 determined by the angular pitch or resolution of the encoder 60 is 0.5 mm, the number of pulses of the A-phase signal is equal to "21" and the residual distance "h" is equal to 0.1 mm. In step S203, the obtained pulse number "n" is stored into a PULSE NUMBER memory 100a of the microcomputer 100.

Then, step S204 is executed to store the residual distance "h" of 0.1 mm into a RESIDUAL DISTANCE memory 100b of the microcomputer 100. The control flow then goes to step S205 to start the spindle motor 6 to operate in the forward direction. Namely, the microcomputer 100 applies control signals to the drivers 97 and 98 to turn on the triacs 93 and 94 for operating the motor 6 in the forward direction in the 8-pole mode.

In the following step S206, the flag F is incremented (to "1"), and the control flow goes back to a main control routine indicated at 230 in the flow chart of FIG. 11.

When the tapping stroke control routine 200 is again executed, a negative decision (NO) is obtained in step S201 since the flag F was set to "1" in the preceding cycle of execution of the routine 200. Accordingly, step S201 is followed by steps S210–S214 for setting a RESIDUAL timer 100c of the microcomputer 100 after the pulse counter 103 has counted the number "n" stored in the PULSE NUMBER memory 100a. More specifically, step S211 is implemented to read the count of the pulse counter 103 of the number of pulses of the A-phase signal generated by the A-phase sensor 65A of the photoelectric detector 65 of the encoder 60. Step S212 is then implemented to calculate each pulse interval Tn (T2, T1, T0). The calculated pulse interval Tn will be used in step S214.

Then, the control flow goes to step S213 to determine whether the count of the pulse counter 103 is equal to the number "n" (i.e., "21" in this example) stored in the PULSE NUMBER memory 100a, or not. If a negative decision (NO) is obtained in step S213, the control flow returns to the main control routine 230. Steps S201 and S210–S213 are repeatedly executed until the count of the pulse counter 103 becomes equal to the number "n".

When the spindle quill 27 has been moved a distance of 10.5 mm, the count of the pulse counter 103 becomes equal to the number "n", an affirmative decision (YES) is obtained in step S213, and the control flow goes to step S214 to set the RESIDUAL timer 100c to the residual time "t", which is calculated based on the residual distance "h" (i.e., 0.1 mm) stored in step S204 in the RESIDUAL DISTANCE memory 100b and the time interval Tn calculated in step S212, and according to the equation (2) or (6) described above. The timer 100c starts counting the time "t", and step S214 is followed by step S206 in which the flag F is incremented to "2".

In the next cycle of execution of the tapping stroke control routine 200, negative decisions (NO) are obtained in steps S201 and S210, and step S220 is implemented to determine whether the residual time "t" corresponding to the residual distance "h" has elapsed, or not. If a negative decision (NO) is obtained in step S220, step S221 is executed to command the spindle motor 6 to be continuously operated in the forward direction to feed the quill 27 in the tapping direction. When the time "t" has eventually elapsed, an affirmative decision (YES) is obtained in step S220, and the control flow goes to step S222 to remove the drive signal from the driver 98 to turn off the triac 94 for the forward rotation of the motor 6, and apply the drive signal to the driver 99 to turn on the triac 95, whereby the spindle motor 6 is operated in the reverse direction to return the quill 27 toward the home position. Step S223 is followed by step S224 to reset the flag F to zero, and the stroke control routine 200 is completed.

Subsequently, the motor 6 is continuously operated in the reverse direction until the home-position signal is received from the home-position sensor 65C of the photoelectric detector 65 of the encoder 60. Thus, the spindle quill 27 or spindle 10 is returned to the home or original position, with the motor 6 stopped when the upper end of the operating stroke X is reached.

While the present embodiment of the control apparatus of the invention has been described, as applied to the regulation of the operating stroke of the spindle 10 (quill 27) of a tapping machine, the principle of the present invention is equally applicable to the regulation of the operating stroke of any other reciprocable member, such as the spindle of a drilling machine and the carriage of office instrument or business machines.

While the present invention has been described in its presently preferred embodiment, it is to be understood that the invention is not limited to the details of the illustrated embodiment, but may be embodied with various changes, modifications and improvements, which may occur to those skilled in the art, without departing from the spirit and scope of the invention defined in the following claims. For example, the rotary encoder 60 may be replaced by a linear encoder for detecting the distance of reciprocating movement of the spindle quill 27 or spindle 10.

What is claimed is:

1. An apparatus for controlling an operating stroke of a reciprocating member which is adapted to be reciprocated over a predetermined distance by a bidirectional drive motor, through a power transmission mechanism operatively connecting said reciprocating member and said drive motor, comprising:

stroke setting means for specifying said operating stroke of said reciprocating member;

an encoder for generating pulses each of which corresponds to a predetermined incremental distance of movement of said reciprocating member;

counting means for counting said pulses generated by said encoder while said reciprocating member is moved in a forward direction;

first calculating means for converting the specified operating stroke into the number of said pulses corresponding to a multiple of said incremental distance of movement of said reciprocating member, and for determining a residual distance which is a difference between said specified operating stroke and said multiple;

second calculating means for converting said residual distance into a corresponding residual time necessary for said reciprocating member to move by said residual distance; and commanding means for commanding said drive motor to stop an operation thereof causing a further movement of said reciprocating member in said forward direction, at a point of time after a count of said counting means is equal to said number of said pulses calculated by said first calculating means and said residual time has passed.

2. An apparatus according to claim 1, further comprising interval measuring means for measuring a pulse interval at which said pulses are generated by said encoder, and wherein said second calculating means calculates said residual time based on the pulse interval measured by said interval measuring means.

3. An apparatus according to claim 2, further comprising memory means for storing data representative of said number of the pulses calculated by said first calculating means.

4. An apparatus according to claim 3, wherein said memory means also stores data representative of said residual distance, and said second calculating means calculates said residual time based on said measured pulse interval and said residual distance represented by said data stored in said memory means.

5. An apparatus according to claim 4, wherein said commanding means comprises determining means for determining whether said count of said counting means is equal to said number of said pulses represented by said data stored in said memory means.

6. An apparatus according to claim 5, wherein said commanding means further comprises time measuring means for measuring said residual time after said determining means determines that said count is equal to said number of the pulses.

7. An apparatus according to claim 6, wherein said commanding means further comprises means for setting said time measuring means to measure said residual time, when said determining means determines that said count is equal to said number of the pulses.

8. An apparatus according to claim 1, wherein said encoder includes an encoding member which rotates with a rotating member of said power transmission mechanism, and a detector which detects a rotating angle of said encoding member.

9. An apparatus according to claim 8, wherein said encoding member has a multiplicity of apertures equally spaced apart from each other in a rotating direction thereof, and said detector includes a light-emitting element and a photoelectric sensor which are disposed on opposite sides of said encoding member, an angular spacing of said apertures corresponding to said incremental distance of movement of said reciprocating member, and said photoelectric sensor generating said pulses each corresponding to said angular spacing.

10. An apparatus according to claim 1, wherein said reciprocating member consists of a rotating member which is rotated by said drive motor through said power transmission mechanism such that said rotating member is axially moved by a distance corresponding to a rotating angle thereof.

11. An apparatus according to claim 10, wherein said rotating member comprises a spindle of a tapping machine.

12. An apparatus according to claim 1, wherein said commanding means commands said drive motor to operate in a reverse direction for moving said reciprocating member in a reverse direction opposite to said forward direction, when said point of time is detected.

* * * * *